US012567779B2

(12) United States Patent
Takahashi et al.

(10) Patent No.: US 12,567,779 B2
(45) Date of Patent: Mar. 3, 2026

(54) ROTATING ELECTRIC MACHINE, ELECTRIC WHEEL, AND VEHICLE

(71) Applicant: Hitachi, Ltd., Tokyo (JP)

(72) Inventors: Akeshi Takahashi, Tokyo (JP); Tetsuya Suto, Tokyo (JP); Makoto Ito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 275 days.

(21) Appl. No.: 18/267,286

(22) PCT Filed: Nov. 25, 2021

(86) PCT No.: PCT/JP2021/043291
§ 371 (c)(1),
(2) Date: Jun. 14, 2023

(87) PCT Pub. No.: WO2022/137976
PCT Pub. Date: Jun. 30, 2022

(65) Prior Publication Data
US 2024/0097524 A1     Mar. 21, 2024

(30) Foreign Application Priority Data
Dec. 22, 2020     (JP) ................................. 2020-211934

(51) Int. Cl.
B60K 11/02 (2006.01)
B60K 7/00 (2006.01)
(Continued)

(52) U.S. Cl.
CPC ........... H02K 5/203 (2021.01); B60K 7/0007 (2013.01); H02K 5/165 (2013.01); H02K 9/197 (2013.01); H02K 2209/00 (2013.01)

(58) Field of Classification Search
CPC ........ H02K 5/203; H02K 5/165; H02K 9/197; H02K 2209/00; H02K 16/00;
(Continued)

(56) References Cited

U.S. PATENT DOCUMENTS

2013/0038151 A1* 2/2013 Ohashi ................... H02K 7/086
310/59
2017/0271958 A1* 9/2017 Kitta ........................ H02K 9/19

FOREIGN PATENT DOCUMENTS

EP 2 006 981 B1 7/2016
JP 3208772 B2 * 9/2001 ............... H02K 9/20
(Continued)

OTHER PUBLICATIONS

JP2020211931 office action filed Sep. 10, 2024, pp. 1-4 (corresponding to WO 2022137862) (Year: 2025).*
(Continued)

*Primary Examiner* — Tisha D Lewis
(74) *Attorney, Agent, or Firm* — Crowell & Moring LLP

(57) ABSTRACT

The rotating electric machine includes a stator having a stator core around which a plurality of coils are wound; a rotor supported to be rotatable relative to the stator with a predetermined gap therebetween; a rotor case that holds the rotor; and a first bearing and a second bearing that rotatably support the rotor case. The rotating electric machine includes: a first flow path formation body that forms a first flow path through which a refrigerant flows to a coil end part protruding from the stator core; a first case part which forms an accommodation space of the first bearing, is connected to the first flow path of the first flow path formation body, and fills the accommodation space with the refrigerant.

18 Claims, 11 Drawing Sheets

(51) Int. Cl.
　　H02K 5/16　　　　(2006.01)
　　H02K 5/20　　　　(2006.01)
　　H02K 9/197　　　(2006.01)

(58) Field of Classification Search
　　CPC .... H02K 21/222; H02K 5/1737; H02K 7/083;
　　　　　　H02K 7/14; H02K 9/19; H02K 5/16;
　　　　　　H02K 7/006; H02K 21/24; F16C 35/06;
　　　　　　F16C 19/10; F16C 33/6692; F16C
　　　　　　37/007; F16C 2326/02; F16C 2380/26;
　　　　　　F16C 33/6659; B60K 7/0007; B60K
　　　　　　11/02; B60K 2007/0038; B60K
　　　　　　2007/0092; F16N 9/00; F16N 2210/14;
　　　　　　F16N 2210/18; F16N 2210/20
　　See application file for complete search history.

(56)　　　　　　　References Cited

FOREIGN PATENT DOCUMENTS

| | | | | | |
|---|---|---|---|---|---|
| JP | 2005-333705 | A | | 12/2005 | |
| JP | 2009148047 | A | * | 7/2009 | ............... B60K 7/00 |

| | | | | | |
|---|---|---|---|---|---|
| JP | 2014-240667 | A | | 12/2014 | |
| JP | 2016-183717 | A | | 10/2016 | |
| JP | 2019-194056 | A | | 11/2019 | |
| WO | WO-2022137862 | A1 | * | 6/2022 | ............... B60K 7/00 |

OTHER PUBLICATIONS

PCT/JP2021041431 written opinion filed Dec. 6, 2022, pp. 1-4 (corresponding to WO 2022137862) (Year: 2025).*

International Preliminary Report on Patentability (PCT/IB/338 & PCT/IB/373) issued in PCT Application No. PCT/JP2021/043291 dated Jul. 6, 2023, including English translation of document C2 (Japanese-language Written Opinion (PCT/ISA/237), filed on Jun. 14, 2023) (5 pages).

International Search Report (PCT/ISA/210) issued in PCT Application No. PCT/JP2021/043291 dated Jan. 25, 2022 with English translation (4 pages).

Japanese-language Written Opinion (PCT/ISA/237) issued in PCT Application No. PCT/JP2021/043291 dated Jan. 25, 2022 (3 pages).

Extended European Search Report issued in European Application No. 21910129.2 dated Aug. 18, 2025 (10 pages).

* cited by examiner

A-A

ROTATING ELECTRIC MACHINE, ELECTRIC WHEEL, AND VEHICLE

CROSS-REFERENCE TO RELATED APPLICATION

This application is a Continuation of PCT Application No. PCT/JP2021/043291, filed Nov. 25, 2021, which claims priority to Japanese Patent Application No. 2020-211934, filed on Dec. 22, 2020, the entire contents of which are incorporated herein by reference.

TECHNICAL FIELD

The present invention relates to a rotating electric machine mounted on a railroad vehicle, an automobile, a construction machine, and the like.

BACKGROUND ART

In order to meet the needs for compactness and light-weightness that accompany advances in electrification, it is desirable to improve the torque density by increasing the motor diameter, and to render machines gearless. To ensure gap accuracy when the motor diameter is increased, it is desirable to use a bearing having a diameter about the same as the gap diameter for the purpose of minimizing the impact of the stacking tolerance.

PTL 1 discloses a rotating electric machine including a rotor-side case that supports a rotor, a stator-side case that supports a stator, and a bearing that couples the rotor-side case to the stator-side case. PTL 1 indicates that the diameter of the bearing is about the same as the gap diameter.

CITATION LIST

Patent Literature

PTL 1: JP 2005-333705 A

SUMMARY OF INVENTION

Technical Problem

As described above, it is effective to increase the diameter of the rotating electric machine in order to improve the torque density, but as the diameter of the rotating electric machine increases, the diameter of the bearing is also increased in order to secure the gap accuracy. However, because the sliding distance and the peripheral speed increase as the diameter of the bearing increases, there is a problem that the sliding loss increases and the efficiency of the rotating electric machine decreases.

In addition, in conventional design concepts, it is recommended to use a temperature close to the ambient temperature of the rotating electric machine as the operating temperature of the bearing. This is because the bearing internal clearance is reduced by the thermal expansion of the rolling elements of the bearing due to a temperature rise, and hence there is an increased risk of sliding friction and galling occurring between the rolling elements and the inner ring and the outer ring. However, in a case where the operating temperature of the bearing is maintained close to the ambient temperature, the lubricating oil in the bearing is in a highly viscous state, and hence the sliding loss described above also increases significantly. Note that the larger the bearing, the larger the heat dissipation area, and the higher the cooling performance of the bearing body. However, when the bearing body is cooled, the highly viscous state of the lubricating oil is maintained. Therefore, from this viewpoint also, the sliding loss tends to increase as the diameter of the bearing becomes larger.

As described above, in the conventional rotating electric machine, it is difficult to avoid an increase in the bearing sliding loss both due to structural factors of the bearing body and also operational factors.

An object of the present invention is to reduce bearing sliding loss and improve the efficiency of a rotating electric machine.

Solution to Problem

In order to achieve the foregoing object, the present invention includes various embodiments. To cite an example of such embodiments, a rotating electric machine of the present invention is a rotating electric machine which includes a stator having a plurality of coils and a stator core around which the plurality of coils are wound, a rotor rotatably supported relative to the stator with a predetermined gap therebetween, a rotor case that holds the rotor, and a first bearing and a second bearing that rotatably support the rotor case, the rotating electric machine including: a first flow path formation body that forms a first flow path through which a refrigerant flows to a coil end part protruding from the stator core; a first case part that forms an accommodation space of the first bearing, that is connected to the first flow path of the first flow path formation body, and that fills the accommodation space with the refrigerant; a second flow path formation body that forms a second flow path through which the refrigerant flows to a coil end part arranged on a side opposite to the coil end part in an axial direction; and a second case part that forms an accommodation space of the second bearing, that is connected to the second flow path of the second flow path formation body, and that fills the accommodation space with the refrigerant.

Advantageous Effects of Invention

With the present invention, bearing sliding loss can be reduced, and the efficiency of the rotating electric machine can be improved.

Problems, configurations, advantageous effects, and the like other than those described above will be clarified by the following descriptions of the embodiments.

DESCRIPTION OF EMBODIMENTS

Hereinafter, embodiments of the present invention will be described with reference to the drawings. In the following description, the same constituent elements are denoted by the same reference signs. The names and functions of such constituent elements are the same, and duplicate descriptions are avoided. The subject of the following description is a rotating electric machine having a variable-speed drive such as an automobile or a railroad vehicle, but the advantageous effect of the present invention is not limited thereto, and can be applied to all rotating electric machines including constant-speed machines. Furthermore, the rotating electric machine may be a permanent magnet synchronous machine or another rotating machine. Further, in the following description, an external rotation-type rotating electric machine is mainly described, but an internal-rotation-type rotating electric machine may also be used. The material of the coil may be copper, aluminum, or another conductive material. The bearing may be a ball bearing or another bearing. Although a liquid refrigerant such as oil is mainly used, other refrigerants may be used.

First Embodiment

Figure 1:
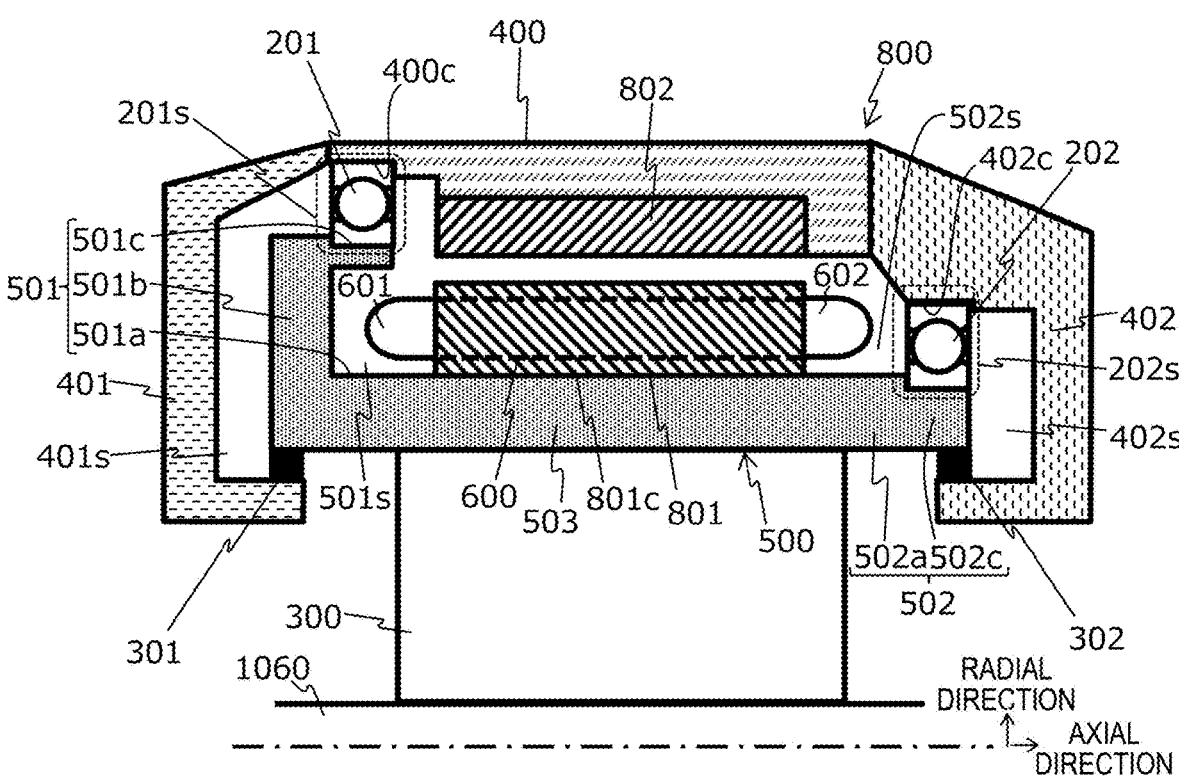
FIG. 1 is an explanatory view of a cross-section of a rotating electric machine according to a first embodiment of the present invention.
Figure 2A:
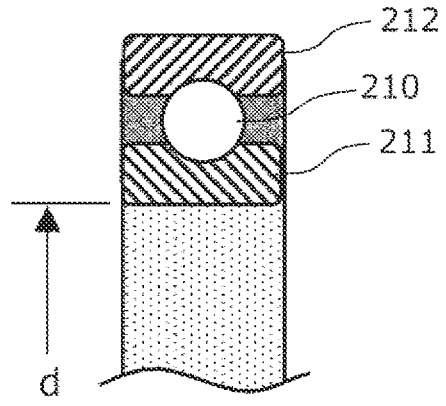
FIGS. 2A and 2B are explanatory views of bearing internal clearance according to the first embodiment of the present invention.
Figure 2B:
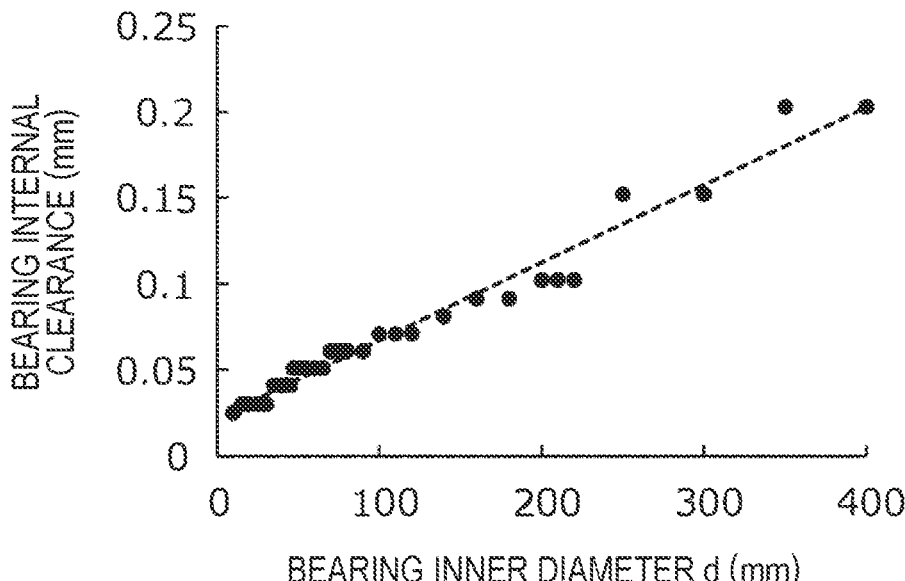
Figure 3A:
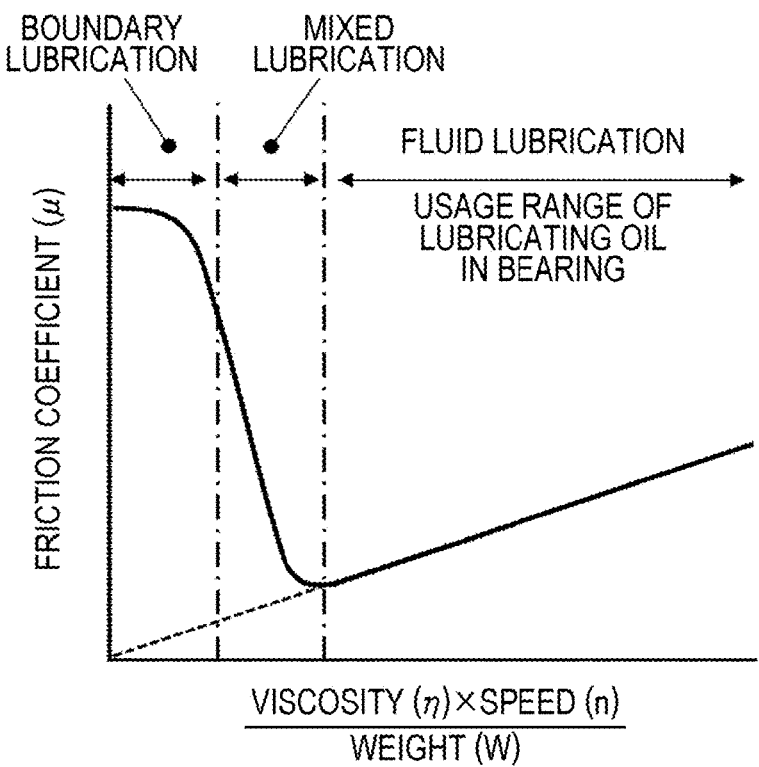
FIG. 3A is an explanatory view of a relationship between a bearing friction coefficient and the viscosity of lubricating oil in the bearing.
Figure 3B:
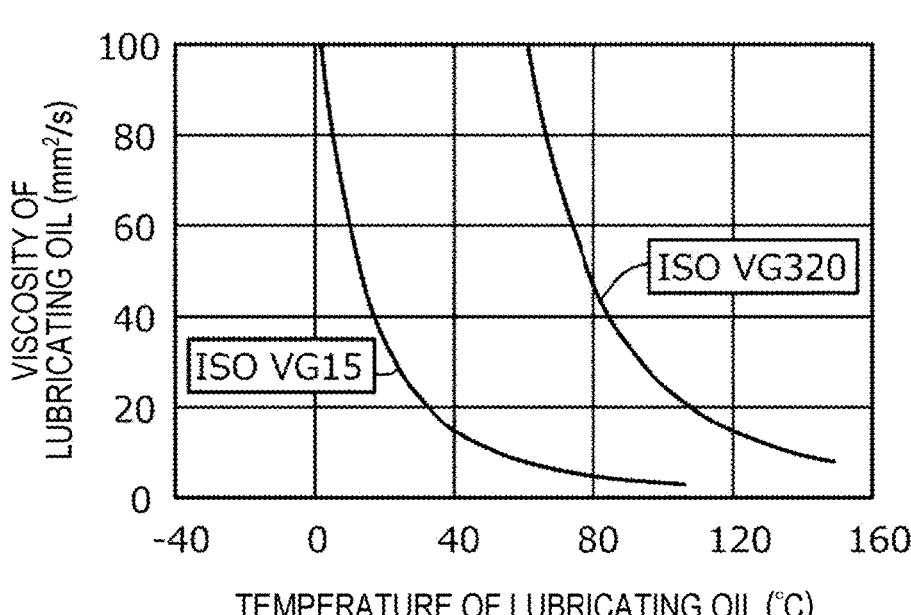
FIG. 3B is an explanatory view of a relationship between temperature and the viscosity of the lubricating oil in the bearing.
Figure 13:
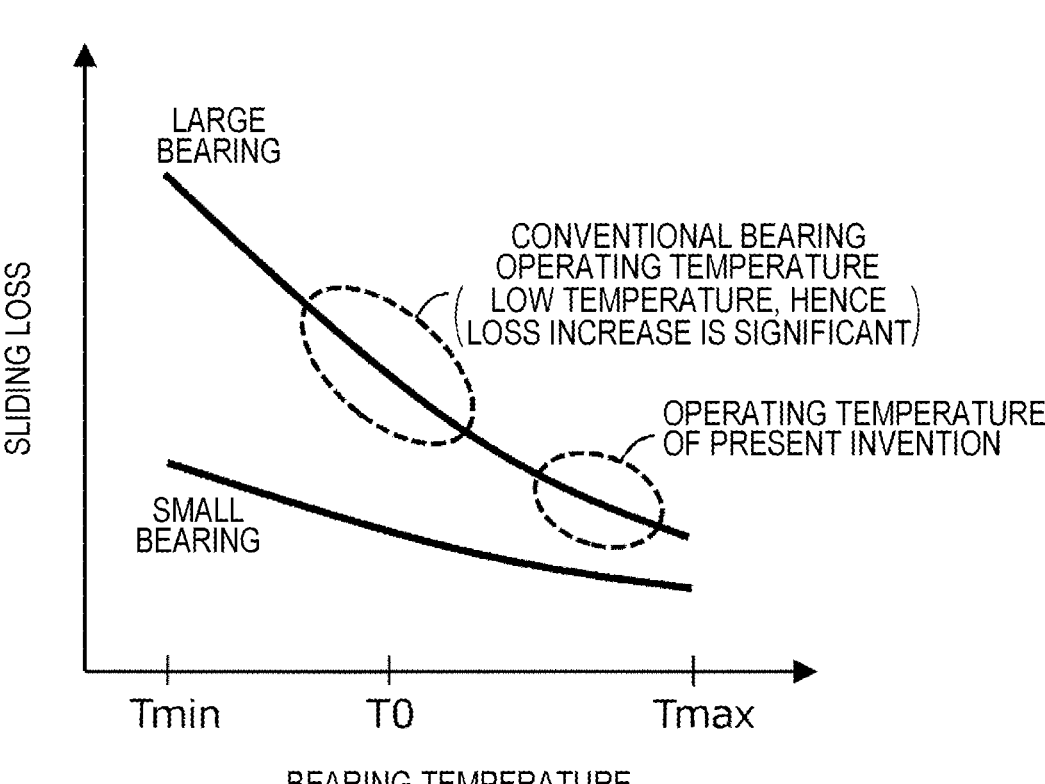
FIG. 13 is a comparative explanatory view of prior art and the present invention.

Hereinafter, a first embodiment of the present invention will be described with reference to FIGS. 1 to 3B. A comparison between the prior art and the present invention will be described with reference to FIG. 13. FIG. 1 is an explanatory view of a cross-section of a rotating electric machine according to the first embodiment of the present invention. FIGS. 2A and 2B are explanatory views of bearing internal clearance according to the first embodiment of the present invention. FIG. 3A is an explanatory view of the relationship between a bearing friction coefficient and the viscosity of the lubricating oil in the bearing, and FIG. 3B is an explanatory view of the relationship between the temperature and the viscosity of the lubricating oil in the bearing. FIG. 13 is a comparative explanatory view of prior art and the present invention.

First, differences between the prior art and the present invention will be described. As illustrated in FIG. 13, the bearing sliding loss tends to decrease as the bearing temperature increases. This is because, as the bearing temperature increases, the viscosity of the lubricating oil in the bearing decreases and the sliding friction decreases. However, the bearing temperature illustrated in FIG. 13 indicates a numerical range which is generally adopted in conventional design concepts. That is, the central part of the horizontal axis represents an ambient temperature TO in an average usage state of the rotating electric machine, the lower limit of the horizontal axis represents a usage environment temperature lower limit value Tmin of the rotating electric machine, and the upper limit of the horizontal axis represents an operating upper limit temperature Tmax of the rotating electric machine.

Tmax is generally set as a maximum temperature that allows operation of the rotating electric machine in a state where the clearance (hereinafter, the bearing internal clearance) inside the bearing is maintained, that is, in a state where the rolling elements secure a predetermined gap relative to the inner ring and the outer ring of the bearing. When the bearing temperature exceeds Tmax, the bearing internal clearance is reduced by thermal expansion of rolling elements such as balls and rollers, and the rolling elements cause sliding friction, thereby increasing the sliding loss. In the worst case, galling between the rolling elements and the inner ring and the outer ring occurs, and thus there is an associated risk of breakage of the bearing, locking of the rotating electric machine and the generation of an accompanying overcurrent, and burning of the coil, and the like. Therefore, Tmax is designed to have a numerical value with tolerance so that the bearing internal clearance can be sufficiently secured.

The difference in the sliding loss between a large bearing and a small bearing with respect to the bearing temperature will now be described with reference to FIG. 13. A large bearing refers to a bearing having a nominal bearing outer diameter from about 180 mm to about 800 mm, and a small bearing refers to a bearing having a nominal bearing inner diameter of 10 mm or more and a nominal bearing outer diameter of up to about 80 mm.

As illustrated in FIG. 13, in a large bearing, in addition to the increase in the sliding loss with respect to the small bearing, the dependence of the bearing temperature (the inclination of the graph of FIG. 13) increases. The reason for the above phenomenon is that the sliding distance and the peripheral speed are large in the large bearing. The reason for the latter phenomenon is that the contact area between the lubricating oil in the bearing and the rolling elements increases, and hence the bearing is easily affected by the viscosity of the lubricating oil. In addition, in conventional design concepts, it is recommended to use a temperature close to the ambient temperature TO in an average usage state of the rotating electric machine as the operating temperature of the bearing. However, in a case where the operating temperature of the bearing is designed in this way, the highly viscous state of the lubricating oil in the bearing is maintained, and hence the sliding loss also remains at a high level. Further, because the large bearing has a large heat dissipation area, the cooling performance of the bearing body is excellent in comparison with the small bearing. However, when the bearing body is cooled, the highly viscous state of the lubricating oil is maintained. Therefore, from this viewpoint also, a large bearing easily settles at a temperature near TO, and the sliding loss readily stays at a high level.

In order to solve such a problem, according to the present invention, a method for shifting the operating temperature of a bearing toward a high temperature for use was devised. As long as the bearing can be used at a temperature close to Tmax and not exceeding Tmax, the bearing internal clearance will not be excessively reduced. However, because the bearing temperature increases, the viscosity of the lubricating oil can be reduced, thereby enabling the sliding loss to be significantly reduced. Therefore, the present inventors considered that it was possible to provide a highly efficient rotating electric machine with a reduced sliding loss while ensuring the long-term reliability of the bearing. The specific means will be described below with reference to FIG. 1.

FIG. 1 is an explanatory view of a cross-section of a rotating electric machine according to the first embodiment of the present invention. A rotating electric machine 800 includes a stator 801 having a plurality of coils (for example, a U-phase coil, V-phase coil, and W-phase coil) 600 and a stator core 801c around which the plurality of coils 600 are wound, and a rotor 802 rotatably supported with respect to the stator 801 with a predetermined gap therebetween. The rotor 802 is held by the rotor case 400, and the rotor case 400 is rotatably supported by the first bearing 201 and the second bearing 202.

The stator 801 is held by a stator case 500. Further, the stator case 500 is held by a stator holding member 300. The stator case 500 and the stator holding member 300 may be configured as separate components or may be configured as an integral component.

The rotor case 400 has a cylindrical shape, and a first case part 401 is provided on one axial end side (the left end side in the drawing) of the rotor case 400, and a second case part 402 is provided on the other axial end side (the right end side in the drawing) of the rotor case 400. A space in which the stator 801 and the rotor 802 are accommodated is formed by the stator case 500, the rotor case 400, the first case part 401, and the second case part 402. A refrigerant is injected into the space from an injection hole (not illustrated), and the space is filled with the refrigerant.

Arranged in the vicinity of a coil end part 601, which is an end part of the coil 600 protruding from the stator core 801c, is a first flow path formation body 501 forming a first flow path 501s through which the refrigerant flows to the coil end part 601, and an accommodation space 201s of the first bearing 201 is connected to the first flow path 501s of the first flow path formation body 501, and a first closed space 401s is configured by the first case part 401 that fills the accommodation space 201s with the refrigerant. The first closed space 401s formed by the first case part 401 communicates with the first flow path 501s via the accommodation space 201s of the first bearing 201. The same configuration is also adopted for a coil end part 602 arranged on the side opposite to the coil end part 601 in the axial direction. Arranged in the vicinity of the coil end part 602, which is an end part of the coil 600 protruding from the stator core 801c, is a second flow path formation body 502 forming a second flow path 502s through which the refrigerant flows to the coil end part 602, and an accommodation space 202s of the second bearing 202 is connected to the second flow path 502s of the second flow path formation body 502, and a second closed space 402s is configured by the second case part 402 that fills the accommodation space 202s with the refrigerant. The second closed space 402s formed by the second case part 402 communicates with the second flow path 502s via the accommodation space 202s of the second bearing 202.

The first flow path formation body 501 and the second flow path formation body 502 are provided to the stator case 500. The stator case 500 according to the present embodiment includes a cylindrical core fixing part 503 to which the stator core 801c is fixed, the first flow path formation body 501 provided on one axial end side of the core fixing part 503, and a second flow path formation body 502 provided on the other axial end side of the core fixing part 503.

The first flow path formation body 501 includes a cylindrical part 501a formed so as to extend in one axial direction (leftward in the drawing) from the core fixing part 503, a flange part 501b formed so as to protrude in the radial direction from a distal end part of the cylindrical part 501a, and a first inner ring holding part 501c formed so as to extend in the other axial direction (rightward in the drawing) from a radial end part of the annular flange part 501b. The inner ring of the first bearing 201 is fitted to the first inner ring holding part 501c. Note that a first outer ring holding part 400c to which the outer ring of the first bearing 201 is fitted is formed at one axial end (left end in the drawing) of the rotor case 400. With this configuration, when viewed from the radial direction of the rotor 802, the first bearing 201 is arranged on the outer diameter side of the coil end part 601 and in a position overlapping the coil end part 601.

The second flow path formation body 502 includes a cylindrical part 502a formed so as to extend from the core fixing part 503 to the other side in the axial direction (the right side in the drawing), and a second inner ring holding part 502c formed so as to further extend in the axial direction from a distal end part of the cylindrical part 502a. The inner ring of the second bearing 202 is fitted to the second inner ring holding part 502c. Note that the second outer ring holding part 402c to which the outer ring of the second bearing 202 is fitted is formed in the second case part 402. With this configuration, the second bearing 202 is arranged in a position overlapping the coil end part 602 when viewed from the axial direction of the rotor 802.

The rotating electric machine 800 is configured to improve torque density and achieve mechanical gearlessness by increasing the diameter of a torque generation part in order to meet the needs for compactness and lightweightness that accompany advances in electrification. Further, to ensure gap accuracy when the diameter is increased, a large bearing about the same as the gap diameter is used for the purpose of minimizing the impact of the stacking tolerance. In addition, for the purpose of increasing the gap diameter, an external rotation-type (outer-rotor) structure capable of obtaining a large torque radius is adopted.

In the present embodiment, because large bearings are employed as the bearings 201 and 202, there is a problem that the sliding loss of the bearings 201 and 202 increases and the efficiency of the rotating electric machine 800 decreases. In order to solve this problem, according to the present embodiment, the operating temperature of the first bearing 201 and the second bearing 202 is shifted toward a high temperature by utilizing heat generation of the coil 600 as a main heat generation source to lower the viscosity of the lubricating oil in the bearing. Note that, in the present embodiment, the refrigerant for cooling the coil 600 also functions as lubricating oil for the bearings 201 and 202.

The main flow of the refrigerant and the heat transfer will be specifically described. When a current is supplied to the coil 600, the coil 600 generates heat. The heat generated by the coil 600 is transferred to the refrigerant in contact with the coil end part 601, and thus the temperature of the refrigerant rises. The refrigerant, which has absorbed the heat of the coil end part 601, flows from the first flow path 501s to the accommodation space 201s of the first bearing 201, and further convects from the accommodation space 201s to the first closed space 401s constituted by the first case part 401. Therefore, the heat generated by coil 600 is transferred from the first flow path 501s to the accommodation space 201s through convection by the refrigerant, and is transferred from the accommodation space 201s to the first closed space 401s. The heat generated by the coil 600 is also transferred from the coil end part 601 to the first flow path formation body 501 via the refrigerant, and is transferred from the first flow path formation body 501 to the first bearing 201.

Note that a portion of the heat is dissipated from the accommodation space 201s of the first bearing 201 to the outside of the rotating electric machine 800 through the rotor case 400, but the heat dissipation area of that part is limited. Most of the heat is dissipated from the outer surface of the first case part 401 forming the first closed space 401s. The temperature of the refrigerant can be effectively lowered by the heat dissipation from the first case part 401. Therefore, in the present embodiment, the output of the rotating electric machine 800 can be increased in comparison with the case where the first closed space 401s is not formed.

In the present embodiment, because the first bearing 201 is arranged in the heat transfer and convection paths described above, the operating temperature of the first bearing 201 can be reliably shifted toward a high temperature. Therefore, according to the present embodiment, the sliding loss of the first bearing 201, which is a large bearing, can be effectively reduced.

Similarly, the heat generated by the coil 600 is transferred and convected from the second flow path formation body 502 and the second flow path 502s to the accommodation space 202s of the second bearing 202 via the refrigerant in contact with the coil end part 602, and further transferred and convected from the accommodation space 202s to the second closed space 402s configured by the second case part 402. Because the second bearing 202 is arranged in these heat transfer and convection paths, the operating temperature of the second bearing 202 can be reliably shifted toward a high temperature. Therefore, in the present embodiment, the sliding loss of the second bearing 202, which is a large bearing, can be effectively reduced. In addition, the temperature of the refrigerant can be effectively lowered by the heat dissipation from the second case part 402. Therefore, in the present embodiment, the output of the rotating electric machine 800 can be increased in comparison with the case where the second closed space 402s is not formed.

In general, the thermal design of the rotating electric machine is set so as to be lower than the allowable temperature of the coil 600 or the allowable temperature of the refrigerant. Therefore, if the bearings 201 and 202 are designed in advance so as to secure the bearing internal clearance when operated at these allowable temperature upper limits, no damage to the bearings 201 and 202 is incurred. In other words, because the bearings 201 and 202 can be controlled to an appropriate high temperature by utilizing the heat generated by the coil 600, it is possible to constantly reduce the sliding loss of the bearings 201 and 202 while ensuring the long-term reliability of the bearings 201 and 202.

The accommodation space 201s of the first bearing 201 may take any form as long as same is connected to the first flow path 501s. Similarly, the accommodation space 202s of the second bearing 202 may take any form as long as same is connected to the second flow path 502s. As a more preferable embodiment, as per the first bearing 201 in FIG. 1, by arranging the first bearing, when viewed from the radial direction of the rotor 802, on the outer diameter side of the coil end part 601 and in a position overlapping the coil end part 601, the convection path from the coil end part 601 to the first bearing 201 can be shortened, and hence the heat generated by the coil 600 can be more effectively transferred to the first bearing 201.

As another embodiment, as per the second bearing 202 in FIG. 1, by also arranging the second bearing in a position overlapping the coil end part 602 when viewed from the axial direction of the shaft supporting the rotor 802, the convection path from the coil end part 602 to the second bearing 202 can be shortened, and hence the heat generated by the coil 600 can be more effectively transferred to the second bearing 202.

Note that, although not illustrated, the refrigerant inside the rotating electric machine 800 may be forcibly circulated by a pump (not illustrated) provided outside the rotating electric machine 800. In a case where the refrigerant is forcibly circulated by the pump, for example, an inlet for the refrigerant from the pump is provided to the cylindrical part 501a or the cylindrical part 502a of the stator case 500. Furthermore, a refrigerant outlet is provided to the cylindrical part 502a or the cylindrical part 501a (a cylindrical part arranged on the opposite side in the axial direction to the cylindrical part where the refrigerant inlet is provided) of the stator case 500. As a result, the refrigerant discharged from the pump and flowing into the rotating electric machine 800 from the inlet flows through the gap between the stator 801 and the rotor 802, and flows out from the outlet. The refrigerant flowing out of the outlet is sucked in by the pump and discharged from the pump again. Note that the refrigerant inlet and outlet may be formed in the case parts 401 and 402 instead of being formed in the stator case 500.

In a case where the refrigerant is not forcibly circulated by the pump, the refrigerant circulates in the rotating electric machine 800 due to natural convection. Specifically, the refrigerant, which has increased in temperature by absorbing the heat of the coil 600, flows upward due to natural convection, and flows from the flow paths 501s and 502s to the closed spaces 401s and 402s through the accommodation spaces 201s and 202s in the upper part of the rotating electric machine 800. When the refrigerant having a high temperature flows into the closed spaces 401s and 402s, heat is transferred from the refrigerant to the case parts 401 and 402. The heat transferred to the case parts 401 and 402 is dissipated to the outside from the case parts 401 and 402. As a result, the temperature of the refrigerant in the closed spaces 401s and 402s decreases, and the refrigerant flows toward the bottom of the rotating electric machine 800. In the lower part of the rotating electric machine 800, the refrigerant flows from the closed spaces 401s and 402s to the flow paths 501s and 502s through the accommodation spaces 201s and 202s.

Note that, in a case where the rotor 802 of the rotating electric machine 800 is rotating, the refrigerant also flows in the circumferential direction of the rotating electric machine 800 due to the rotation of the rotor 802.

The higher the thermal conductivity and the heat transfer coefficient of the refrigerant are, the greater the temperature rise effect of the bearings 201 and 202 becomes, and thus, from this viewpoint, the refrigerant is better in liquid form than in gas form. As the refrigerant, oil that can be used to lubricate and cool components, for example, vegetable oil such as palm coconut oil, mineral oil, automatic transmission fluid (ATF), and the like, can be adopted. The refrigerant is sealed in the closed spaces 401s and 402s by seals 301 and 302.

Although the rotor case 400 and the second case part 402 are configured as separate components in FIG. 1, same may be manufactured as the same component. In a case where the rotor case 400 and the second case part 402 are formed of the same component, machining of the accommodation space 201s of the first bearing 201 and the accommodation space 202s of the second bearing 202 can be completed in the same process, and hence concentricity of the accommodation spaces 201s and 202s can be easily secured. As a result, because the gap eccentricity of the rotor 802 can be suppressed, in addition to enabling vibration and noise to be reduced, the imbalance of the loads acting on the bearings 201 and 202 can be diminished, and the long-term reliability of the bearings 201 and 202 can be improved. Further, because the machining of the accommodation spaces 201s and 202s can be completed in the same process, the manufacturing cost of the rotating electric machine 800 can be reduced.

Furthermore, in FIG. 1, by arranging the first bearing 201 in the radial direction of the coil end part 601, the axial length of the entire rotating electric machine can be shortened. That is, the rotating electric machine 800 can be made more compact and lightweight. Furthermore, by arranging the second bearing 202 on the inner diameter side of the first bearing 201, the rotor case 400, the second case part 402, the rotor 802, the first bearing 201, and the second bearing 202 can be pre-assembled and then assembled on the stator case 500 as one component, thereby facilitating the assembly work. As a result, the manufacturing cost of the rotating electric machine 800 can be reduced.

However, although the first bearing 201 is attached to the rotor case 400 in FIG. 1, same may also be configured to be attached to the first case part 401. With such a configuration, when the bearing is damaged, the bearings 201 and 202 can be replaced simply by removing the first case part 401 and the second case part 402 from the rotor case 400, thereby improving maintainability.

Means for providing a high-efficiency rotating electric machine 800, in which the sliding loss of the bearings 201 and 202 is reduced while securing the long-term reliability of the bearings 201 and 202, has been described above.

Here, the bearing internal clearance will be described with reference to FIGS. 2A and 2B. The bearing internal clearance refers to clearance secured between rolling elements 210 and an inner ring 211 and an outer ring 212 shown in FIG. 2A, and corresponds to a movement amount in a case where one of the inner ring 211 and the outer ring 212 is fixed and the other is moved in the radial direction from an eccentric extreme position to a radially opposite extreme position. Furthermore, in a general bearing, as shown in FIG. 2B, the bearing internal clearance is designed to increase as the inner diameter (bearing inner diameter) d of the inner ring 211 increases. This is because the sliding distance increases as the bearing inner diameter d increases, and heat generation and thermal expansion of the rolling elements 210 become significant. However, in the mechanical gearless rotating electric machine 800 which is the subject of the present embodiment, the amount of heat generated by the bearings 201 and 202 is extremely small with respect to the amount of heat generated by the coil 600 due to the configuration in which a large torque is generated using low-speed rotation. Therefore, the temperature of the bearings 201 and 202 is controlled by the temperature of the refrigerant responsible for the heat dissipation from the coil 600. That is, if the heat generation amount of the coil 600 is the same, as the bearing inner diameter d increases, a larger bearing internal clearance can be secured, and long-term reliability can be improved while the bearings 201 and 202 are used at higher temperatures.

Next, the validity of the relationship between the bearing temperature and the sliding loss illustrated in FIG. 13 will be described using a theoretical formula and FIGS. 3A and 3B.

First, FIG. 3A shows the relationship between the friction coefficient and the viscosity of the lubricating oil. The state of the lubricating oil in the bearing generally depends on a viscosity η, a rotational speed n of the bearing, and a load (radial load) W acting on the bearing, and shifts sequentially to boundary lubrication, mixed lubrication, and fluid lubrication as η×n/W increases. The friction coefficient μ is high in the case of boundary lubrication and mixed lubrication, which do not afford the original function of the bearing to transfer rotation smoothly. Therefore, under the condition that the rotating electric machine rotates constantly, the bearing is used in a state of fluid lubrication.

As illustrated in FIG. 3A, the friction coefficient μ is expressed by Equation (1) below in the state of fluid lubrication.

$$\mu \text{ to } \eta \cdot n / W \tag{1}$$

On the other hand, the viscosity η of the lubricating oil is inversely proportional to the temperature T of the lubricating oil as shown in FIG. 3B, and is expressed by Equation (2) below.

$$\eta \text{ to } 1/T \tag{2}$$

Note that, in FIG. 3B, the ISO VG 15 having a relatively low viscosity and the ISO VG 320 having a relatively high viscosity are illustrated as examples of industrial lubricating oil, but the present invention is not limited thereto.

A sliding loss Q is expressed by Equation (3) below using the rotational speed n, the bearing load W, and the bearing inner diameter d.

$$Q \text{ to } \mu \cdot n \cdot W \cdot d \tag{3}$$

When Equation (3) is rewritten using Equations (1) and (2), the following Equation (4) is obtained.

$$Q \text{ to } 1/T \cdot n^2 \cdot d \tag{4}$$

In the light of Equation (4), it can be seen that, when the rotational speed n is the same, the sliding loss Q is proportional to the bearing inner diameter d and inversely proportional to the temperature T. This fact is consistent with the tendency shown in FIG. 13.

Note that, although the bearing internal clearance is reduced by the thermal expansion of the rolling elements 210 due to a temperature rise, as long as sufficient bearing internal clearance is secured, the friction coefficient μ does not significantly increase, and thus it may be said that the impact on Equation (1) is small.

Figure 4A:
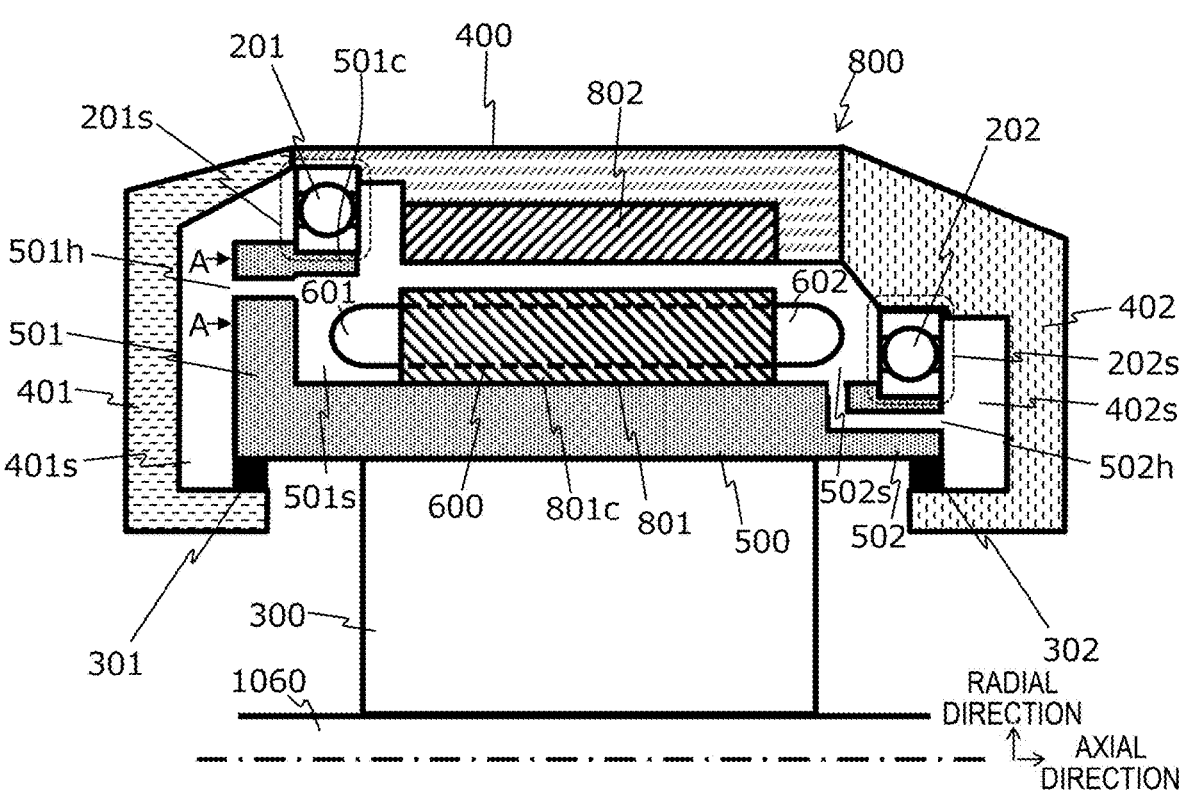
FIG. 4A is an explanatory view of a modification of the cross-section of the rotating electric machine according to the first embodiment of the present invention.
Figure 4B:
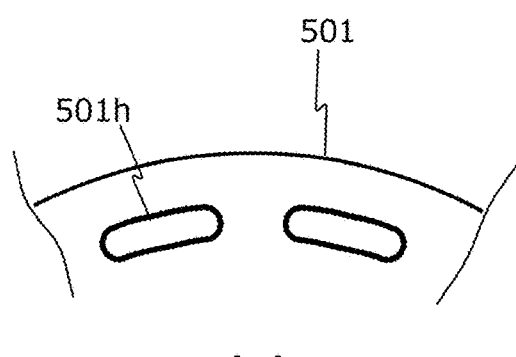
FIG. 4B shows a partial side view taken from A-A in FIG. 4A.
Figure 5:
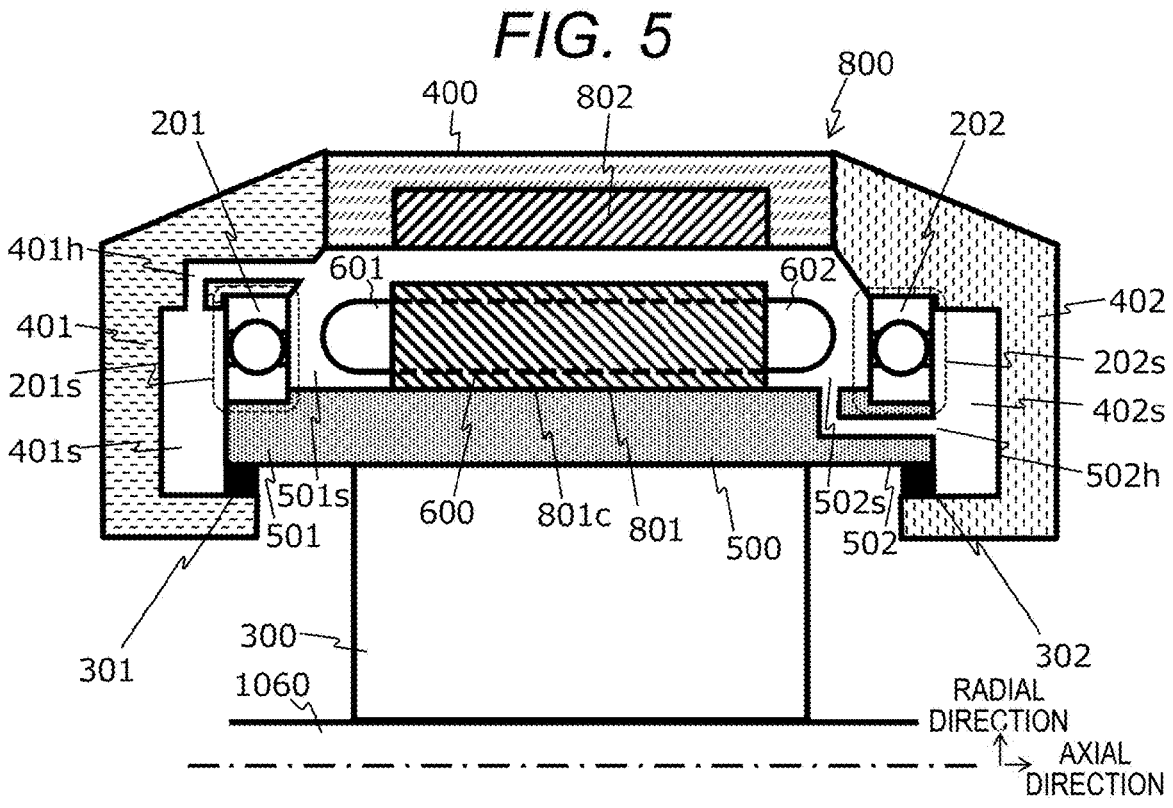
FIG. 5 is an explanatory view of another modification of the cross-section of the rotating electric machine according to the first embodiment of the present invention.
Figure 6:
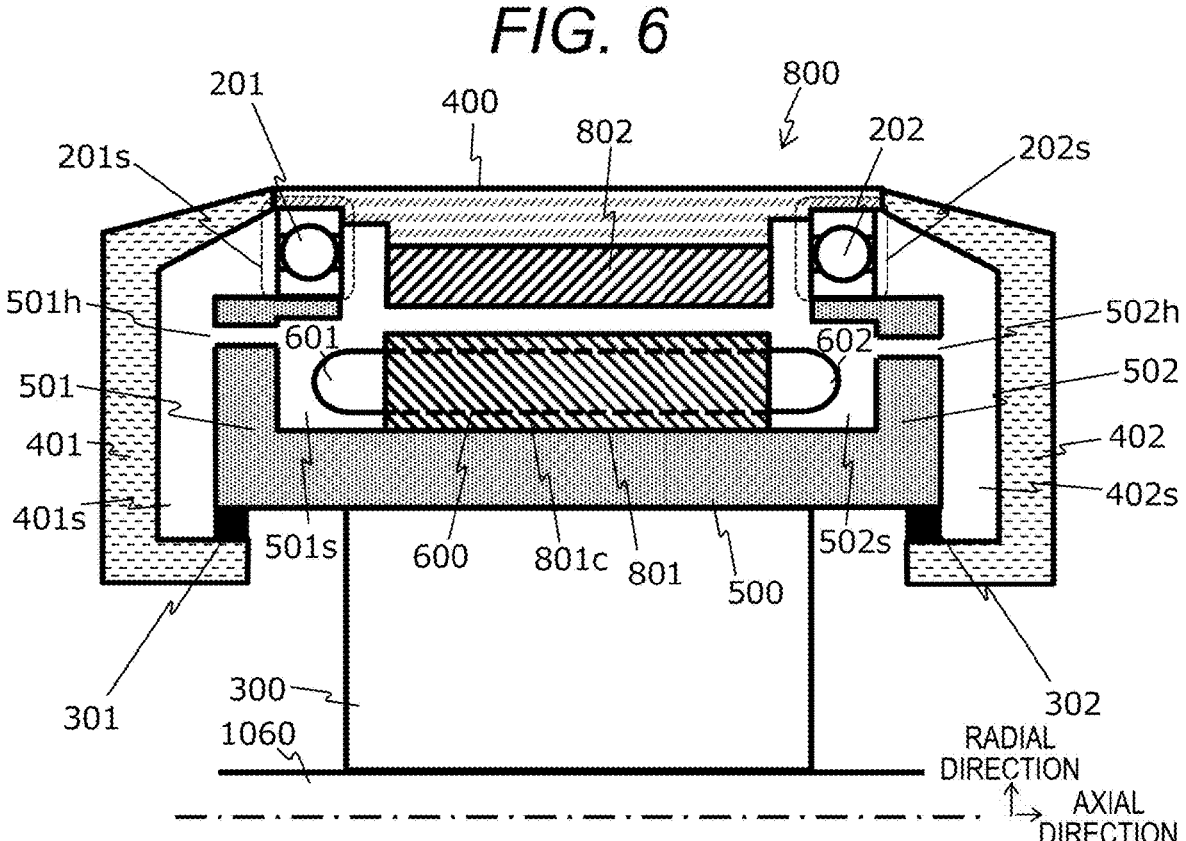
FIG. 6 is an explanatory view of yet another modification of the cross-section of the rotating electric machine according to the first embodiment of the present invention.

Next, modifications of the present embodiment are illustrated in FIGS. 4 to 6.

FIG. 4 differs from FIG. 1 in that a refrigerant circulation hole 501h is provided in the first flow path formation body 501 to constantly circulate the refrigerant. As shown in cross-section A-A of FIG. 4, the refrigerant circulation hole 501h is a plurality of pits provided in the circumferential direction. The first flow path 501s and the first closed space 401s communicate with each other through the refrigerant circulation hole 501h. The shape of the pit may be an elongated pit or a circle. In a case where there is no refrigerant circulation hole 501h, the refrigerant in the first closed space 401s constituted by the first case part 401 does not circulate, but by providing the refrigerant circulation hole 501h, a path through which the refrigerant (lubricating oil) constantly circulates in the first bearing 201 is formed. As a result, lubrication of the first bearing 201 can be promoted, and long-term reliability of the first bearing 201 can be improved. Similarly, the same advantageous effect can be obtained by providing the second flow path formation body 502 with a refrigerant circulation hole (pit) 502*h* that establishes communication between the second flow path 502*s* and the second closed space 402*s*.

The size and number of the refrigerant circulation holes 501*h* and 502*h* and the positional relationships thereof with the bearings 201, 202 are determined according to the operating conditions and the like of the rotating electric machine 800. As a result, the bearings 201 and 202 can be controlled to an appropriate high temperature by using the heat generation of the coil 600. Therefore, it is possible to constantly reduce the sliding loss of the bearings 201 and 202 while ensuring the long-term reliability of the bearings 201 and 202.

Note that, although not illustrated, a check valve for controlling the flow of the refrigerant may be provided inside the rotating electric machine 800. For example, the refrigerant circulation hole 501*h* may be provided with a check valve that allows flow in one direction and prohibits flow in the other direction. Furthermore, instead of providing the check valve in the refrigerant circulation hole 501*h*, a check valve may be provided between the first flow path 501*s* and the accommodation space 201*s*. In this case, for example, a member extending from the first inner ring holding part 501*c* toward the end surface of the rotor 802 is provided, and a check valve is attached to this member.

By providing the check valve, a circulation path through which the refrigerant flows in the first flow path 501*s*, the accommodation space 201*s*, the first closed space 401*s*, the refrigerant circulation hole 501*h*, and the first flow path 501*s*, in that order, or a circulation path through which the refrigerant flows in the first flow path 501*s*, the refrigerant circulation hole 501*h*, the first closed space 401*s*, the accommodation space 201*s*, and the first flow path 501*s*, in that order, is formed. As a result, the operating temperature of the bearing 201 can be controlled. Furthermore, the operating temperature of the bearing 201 may be controlled by providing a guide member that guides the refrigerant together with the check valve or instead of the check valve. Note that, similarly, a check valve and a guide member may be provided on the second flow path 502*s* side.

FIG. 5 differs from FIG. 1 in that the bearings 201 and 202 are respectively arranged in positions overlapping the coil end parts 601 and 602 when viewed from the axial direction. Even in such a configuration, because the bearings 201 and 202 can be controlled to an appropriate high temperature using the heat generation of the coil 600 as in FIG. 1, it is possible to constantly reduce the sliding loss of the bearings 201 and 202 while ensuring the long-term reliability of the bearings 201 and 202. In addition, the entire rotating electric machine can be shortened in the radial direction. That is, the rotating electric machine 800 can be made more compact and lightweight.

In addition, in FIG. 5, the first case part 401 is provided with a refrigerant circulation hole 401*h* to circulate the refrigerant constantly. The configuration of the refrigerant circulation hole 401*h* is similar to the form illustrated in cross-section A-A of FIG. 4. Further, in FIG. 5, the second flow path formation body 502 is also provided with a refrigerant circulation hole 502*h* to circulate the refrigerant constantly.

Note that, instead of the refrigerant circulation hole 401*h*, the first flow path formation body 501 may be provided with a refrigerant circulation hole that allows the first flow path 501*s* and the first closed space 401*s* to communicate with each other. Similarly, instead of the refrigerant circulation hole 502*h*, a refrigerant circulation hole that causes the second flow path 502*s* to communicate with the second closed space 402*s* may be provided in the second case part 402.

In FIG. 5, because the first case part 401 and the second case part 402 have a bilaterally symmetrical relationship to one another, the number of components can be reduced. Note that, in FIG. 5, the rotor case 400, the first case part 401, and the second case part 402 are configured as separate components, and when the bearing is damaged, the bearings 201 and 202 can be replaced simply by removing the first case part 401 and the second case part 402 from the rotor case 400, and hence maintainability can be improved. However, the rotor case 400 and the first case part 401, or the rotor case 400 and the second case part 402 may be manufactured as the same component, thereby enabling the number of components to be reduced.

FIG. 6 differs from FIG. 1 in that the bearings 201 and 202 are respectively arranged, when viewed from the radial direction of the rotor 802, on the outer diameter side of the coil end parts 601 and 602 and in positions overlapping the coil end parts 601 and 602. Even in such a configuration, because the bearings 201 and 202 can be controlled to an appropriate high temperature using the heat generation of the coil 600 as in FIG. 1, it is possible to constantly reduce the sliding loss of the bearings 201 and 202 while ensuring the long-term reliability of the bearings 201 and 202. In FIG. 6, the first flow path formation body 501 and the second flow path formation body 502 are provided with refrigerant circulation holes 501*h* and 502*h*, respectively, to circulate the refrigerant constantly.

In addition, in FIG. 6, because the first case part 401 and the second case part 402 have a bilaterally symmetrical relationship to one another, the number of components can be reduced. Note that, although the rotor case 400, the first case part 401, and the second case part 402 are each configured as separate components in FIG. 6, the number of components can be reduced by manufacturing the rotor case 400 and the first case part 401 or the rotor case 400 and the second case part 402 as the same component.

However, although the bearings 201 and 202 are attached to the rotor case 400 in FIG. 6, the configuration may also be such that the first bearing 201 is attached to the first case part 401, and the second bearing 202 is attached to the second case part 402. With such a configuration, when the bearing is damaged, the bearings 201 and 202 can be replaced simply by removing the first case part 401 and the second case part 402 from the rotor case 400, thereby improving maintainability.

In the rotating electric machine 800 described above, it is also possible to reduce the sliding loss of the bearings 201 and 202 by energizing the coil 600 in a state where the rotor 802 is stopped and by performing a warm-up operation.

Second Embodiment

Figure 7:
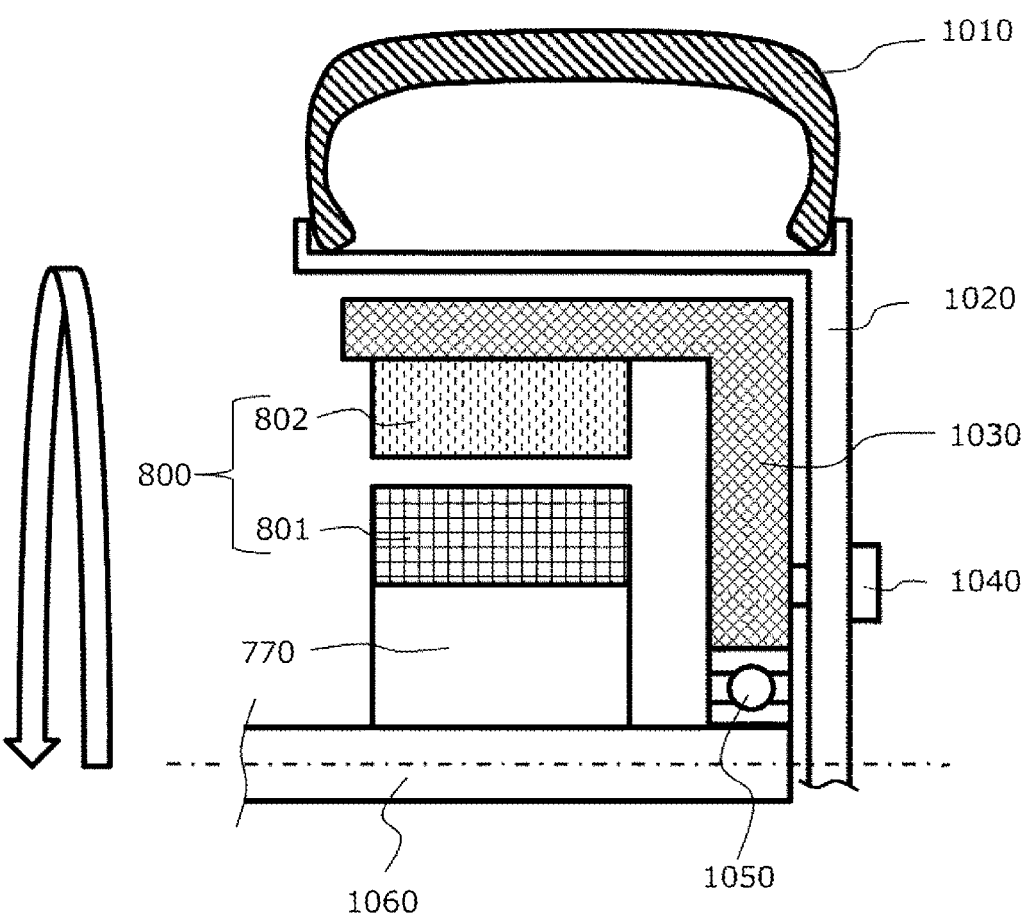
FIG. 7 is a schematic cross-sectional view of an electric wheel according to a second embodiment of the present invention.

FIG. 7 is a schematic cross-sectional view of an in-wheel-type electric wheel 1000 according to a second embodiment of the present invention. Note that, in FIG. 7, an illustration of the internal structure of the rotating electric machine 800 is omitted. The in-wheel-type electric wheel 1000 is provided with a rotating electric machine 800 having an external rotation-type rotor 802 inside a so-called wheel 1020. The rotor 802 of the rotating electric machine 800 is connected to a rotor frame 1030. The rotor frame 1030 is connected to the wheel 1020 by a connecting member 1040.

A tire 1010 is fitted to the wheel 1020. The wheel 1020 and the rotor 802 are rotatably supported with respect to a shaft 1060. For this purpose, the wheel 1020 or the rotor frame 1030 is connected to the shaft 1060 by a bearing 1050.

Meanwhile, the stator 801 of the rotating electric machine 800 is fixedly supported on the shaft 1060 by a support member (not illustrated), and a power conversion device 770 is also mounted on the support member. The power conversion device 770 supplies power to the stator 801 to rotate the rotor 802. Rotation of the rotor 802 is transmitted to the wheel 1020 via the rotor frame 1030 and the connecting member 1040. The wheel 1020 rotates about the shaft 1060.

By applying the rotating electric machine 800 described in the first embodiment to the electric wheel 1000, it is possible to provide a highly efficient and highly reliable electric wheel 1000 without increasing the overall size and manufacturing costs. Therefore, the rotating electric machine 800 can be accommodated on the inner peripheral side of the wheel 1020, and at the same time, can be made gearless, that is, direct driving of the wheel 1020 is enabled.

Conventional electric wheels use gears, and there have been problems such as wear and noise of the gears and an increase in the number of bearings used because the gears need to be supported.

In contrast, in the electric wheel 1000 using the rotating electric machine 800 according to the present embodiment, the rotating electric machine 800 is directly coupled to the wheel 1020 only by a mechanical coupling part (connecting member 1040), without interposing a gear. Therefore, maintenance that takes into account gear wear becomes unnecessary, and noise generated by the gears is eliminated. In addition, the usage amount of the bearings is minimized, there is a reduced risk of wear of the bearings, and the amount of maintenance work to replace the grease in the bearings, and so forth, can be reduced. Furthermore, because the rotating electric machine 800 has a small size, the power conversion device 770 can also be mounted inside the wheel 1020, and it is possible to make the electric wheel 1000 compact and lightweight due to the synergistic effect with the gearless configuration.

Figure 8:
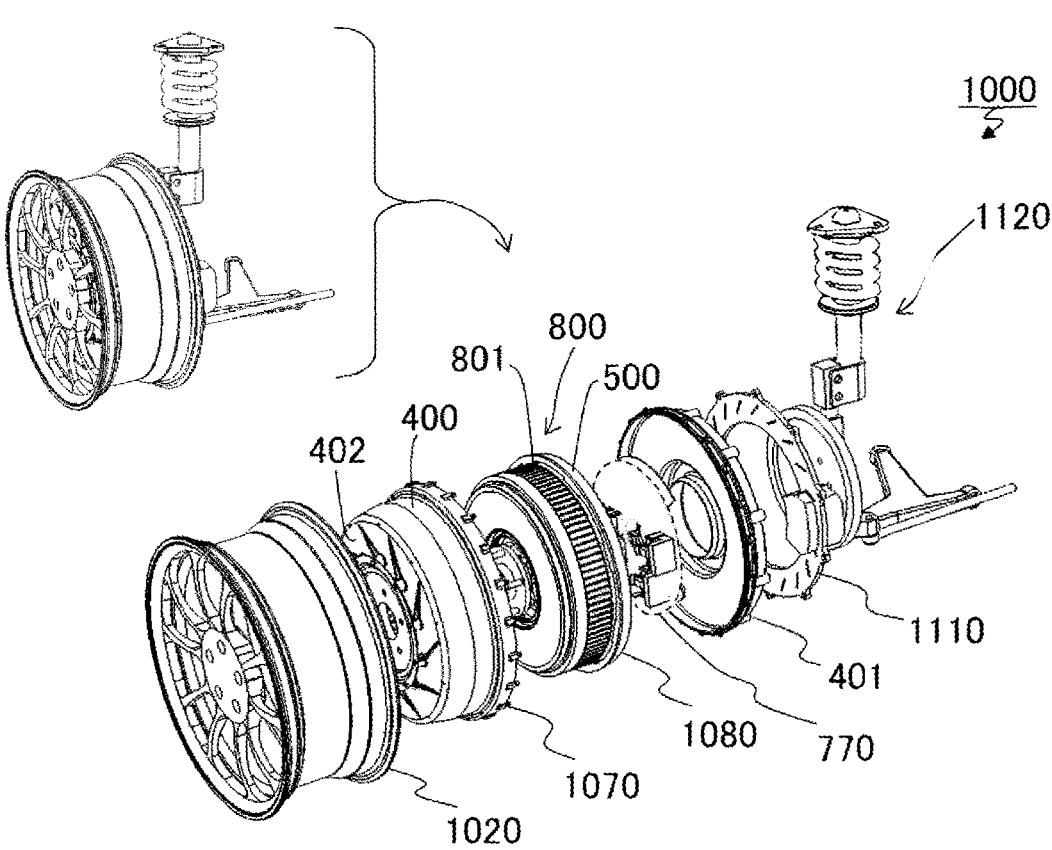
FIG. 8 is an exploded perspective view of the electric wheel according to the second embodiment of the present invention.

FIG. 8 is an exploded perspective view of the electric wheel 1000. The electric wheel 1000 includes the wheel 1020, a rotor assembly 1070, a stator assembly 1080, the power conversion device 770, and the first case part 401. The rotor assembly 1070 includes a rotor, a rotor case 400, and a second case part 402. The stator assembly 1080 includes a stator 801 and a stator case 500. Attached to the electric wheel 1000 is a disc brake 1110 that generates a braking force for braking a vehicle wheel. The electric wheel 1000 is attached to a frame constituting a vehicle body via a suspension device 1120. Because the rotating electric machine 800 used for the electric wheel 1000 according to the present embodiment is compact and lightweight, a so-called unsprung weight is reduced, and the drivability and steering performance are improved.

Third Embodiment

Figures 9, 10:
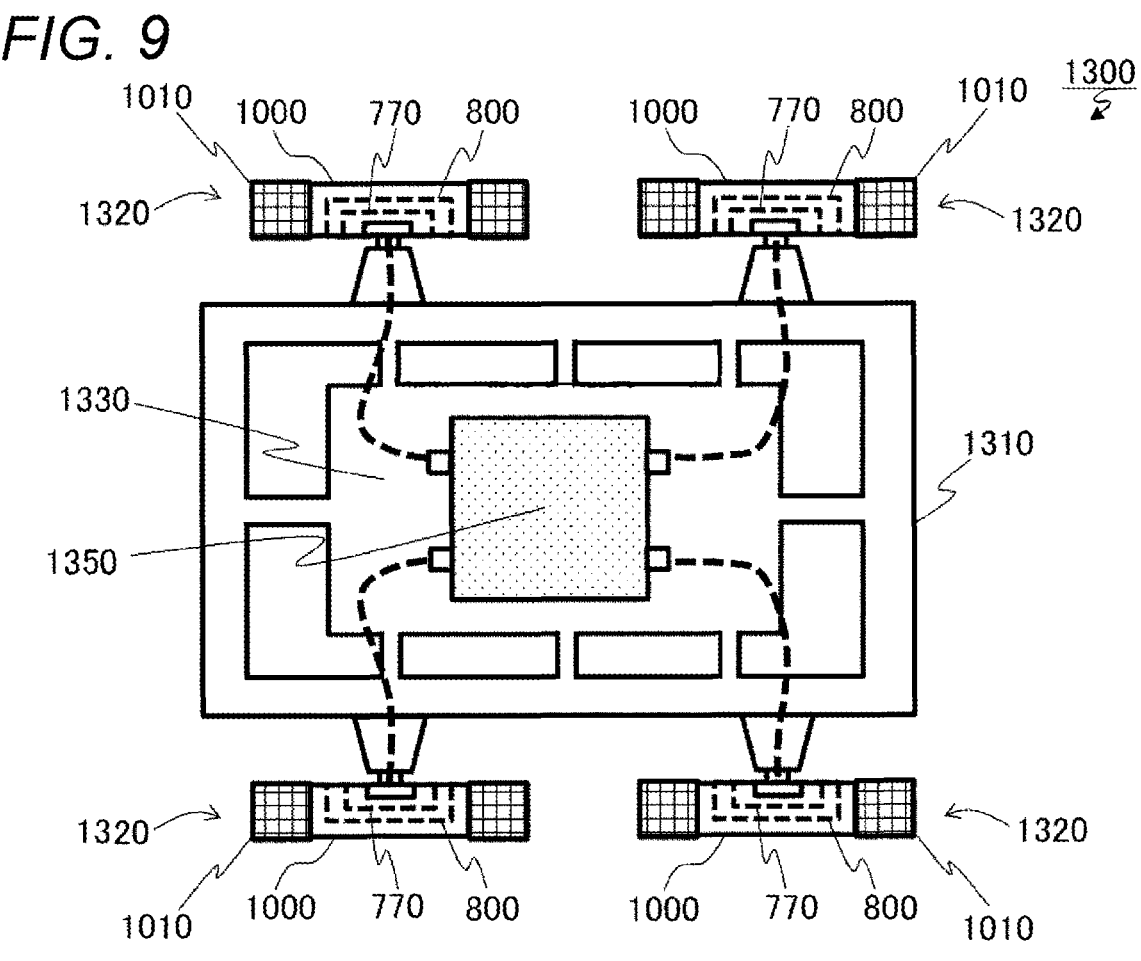
FIG. 9 is a schematic plan view of a vehicle according to a third embodiment of the present invention.
FIG. 10 is a schematic plan view of a vehicle according to a fourth embodiment of the present invention.

A third embodiment will be described with reference to FIG. 9. FIG. 9 is a schematic plan view of a vehicle 1300 according to this embodiment. The vehicle 1300 includes a vehicle body frame 1310, a plurality of vehicle wheels 1320, a battery stage 1330 fixed to the vehicle body frame 1310, and a battery 1350 mounted on the battery stage 1330. Each vehicle wheel 1320 includes an electric wheel 1000 and a tire 1010 attached to the outer periphery of the electric wheel 1000. A rotating electric machine 800 and a power conversion device 770 are mounted on the electric wheel 1000. The electric wheel 1000 is connected to the battery 1350 by a power cable. The power conversion device 770 converts DC power supplied from the battery 1350 into AC power and supplies the AC power to the rotating electric machine 800. When the electric power is supplied to the rotating electric machine 800, the rotating electric machine 800 generates torque. The torque generated by the rotating electric machine 800 is transmitted to the wheels 1020 of the vehicle wheels 1320, and the vehicle 1300 travels due to the rotation of the vehicle wheels 1320.

The vehicle 1300 includes the rotating electric machine 800 described in the first embodiment above. Therefore, with the present embodiment, it is possible to provide the vehicle 1300 which includes the highly efficient and highly reliable rotating electric machine 800 in which the sliding loss of the bearings 201 and 202 is reduced while ensuring the long-term reliability of the bearings 201 and 202.

Because the torque density of the rotating electric machine 800 according to the present embodiment is high, the vehicle 1300 can be directly driven. That is, in the present embodiment, gearless driving of the vehicle 1300, that is, direct driving of the vehicle wheels 1320 by directly transmitting the torque of the rotating electric machine 800 to the vehicle wheels 1320 is enabled. Conventional electric vehicles use gears, and there have been problems such as wear and noise of the gears and an increase in the number of bearings used because the gears need to be supported. In contrast, the vehicle 1300 using the rotating electric machine 800 according to the present embodiment having a high torque density is directly driven and thus does not require gears. Therefore, maintenance that takes into account gear wear becomes unnecessary, and noise generated by the gears is eliminated. Further, the usage amount of the bearings is minimized, and the risk of wear of the bearings is reduced. In addition, the amount of maintenance work to replace the grease in the bearings, and so forth, can be reduced. Furthermore, because the rotating electric machine 800 has a small volume, it is possible to make the vehicle 1300 more compact and lightweight due to the synergistic effect with the gearless configuration.

Fourth Embodiment

A fourth embodiment will be described with reference to FIG. 10. FIG. 10 is a schematic plan view of a vehicle 1600 according to this embodiment. An internal-rotation-type rotating electric machine 1100 is used for the vehicle 1600.

The rotating electric machine 1100 is fixedly supported on a cart 1640 by a support member 1610. The rotor of the rotating electric machine 1100 is directly coupled to an axle 1630, and the rotating electric machine 1100 drives the vehicle wheels 1620 via the axle 1630. The vehicle 1600 includes a rotating electric machine 1100, a battery 1650, and a power conversion device 1660 that converts DC power of the battery 1650 into AC power and supplies the AC power to the rotating electric machine 1100.

Similarly to the rotating electric machine 800 described in the first embodiment above, the rotating electric machine 1100 employs a structure in which the operating temperature of the bearings 201 and 202 is shifted toward a high temperature by using the heat generation of the coil 600 to lower the viscosity of the lubricating oil (refrigerant) in the bearing. Therefore, with the present embodiment, it is possible to provide the vehicle 1600 which includes the highly efficient and highly reliable rotating electric machine 800 in which the sliding loss of the bearings 201 and 202 is reduced while ensuring the long-term reliability of the bearings 201 and 202.

Because the torque density of the rotating electric machine 1100 according to the present embodiment is high, the vehicle 1600 can be directly driven. That is, gearless driving of the vehicle 1600, that is, direct driving of the vehicle wheels 1620 by directly transmitting the torque of the rotating electric machine 1100 to the vehicle wheels 1620, is enabled. Conventional electric vehicles use gears, and there have been problems such as wear and noise of the gears and an increase in the number of bearings used because the gears need to be supported. In contrast, the vehicle 1600 using the rotating electric machine 1100 according to the present embodiment having a high torque density is directly driven and thus does not require gears. Therefore, maintenance that takes into account gear wear becomes unnecessary, and noise generated by the gears is eliminated. Further, the usage amount of the bearings is minimized, and the risk of wear of the bearings is reduced. In addition, the amount of maintenance work to replace the grease in the bearings, and so forth, can be reduced. Furthermore, because the rotating electric machine 1100 has a small volume, it is possible to make the vehicle 1600 more compact and lightweight due to the synergistic effect with the gearless configuration.

Figure 11:
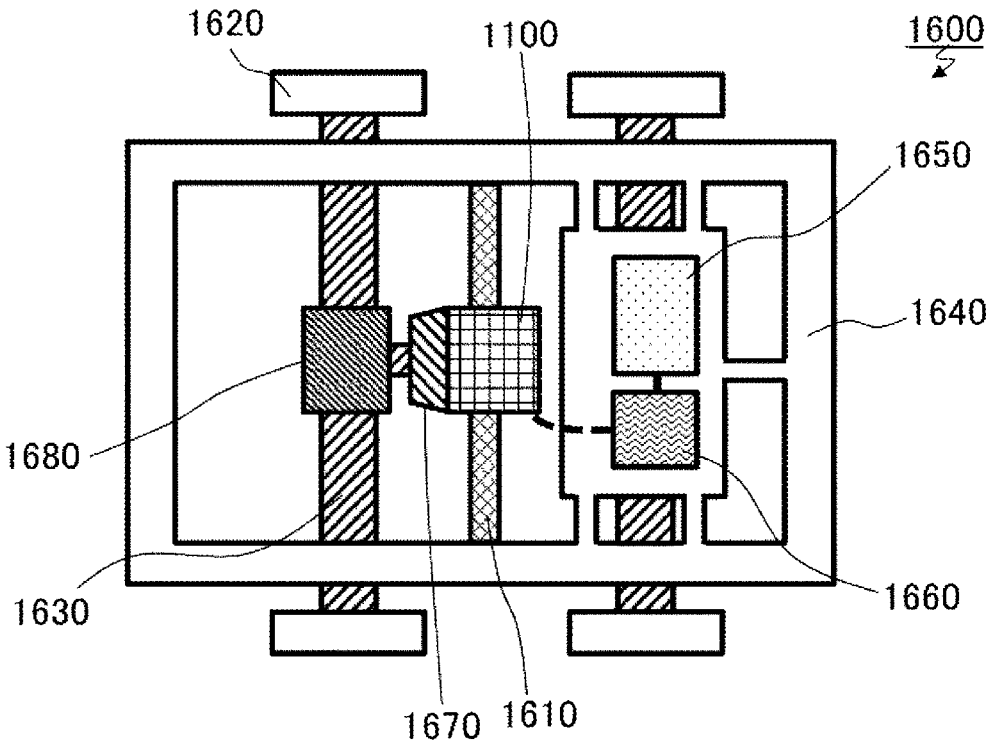
FIG. 11 is a schematic plan view of a modification of the vehicle according to the fourth embodiment of the present invention.

Next, a modification of the present embodiment is illustrated in FIG. 11.

FIG. 11 differs from FIG. 10 in that the torque of the rotating electric machine 1100 is transmitted to the vehicle wheels 1620 via a transmission 1670, a differential gear 1680, and the axle 1630. Even in the case of such a configuration, the sliding loss of the bearings 201 and 202 can be reduced, and the efficiency of the rotating electric machine 1100 can be improved.

In addition, the vehicle affords the same advantageous effect by applying the rotating electric machine of the present invention regardless of whether the vehicle is an electric vehicle driven only by the power of the rotating electric machine or is a hybrid vehicle including an engine. Furthermore, the electric device in which the rotating electric machine of the present invention is mounted is lightweight and durable, and thus easy to use. Further, because the cooling effect is also improved, the operation efficiency is also improved.

Fifth Embodiment

Figure 12:
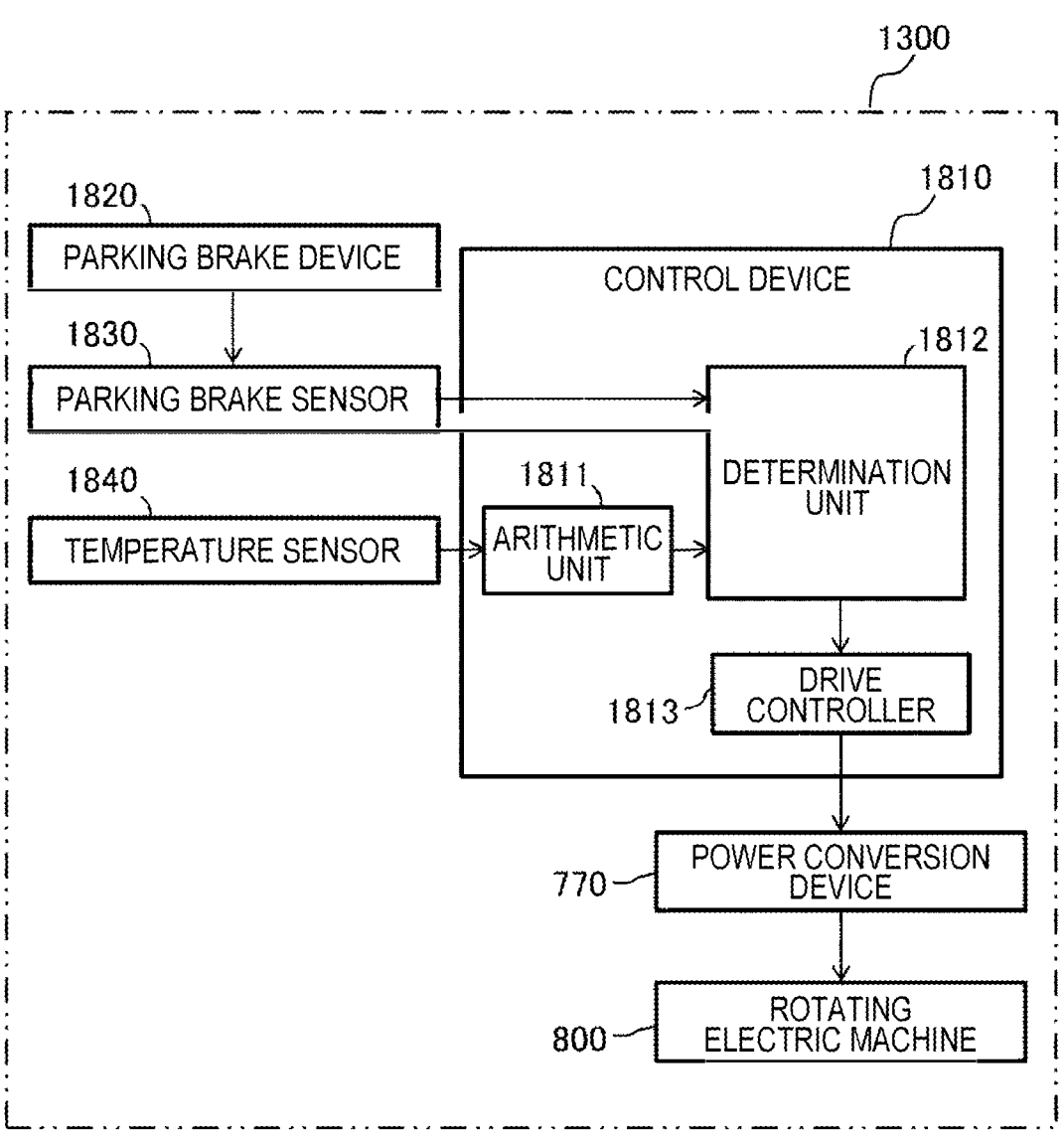
FIG. 12 is a functional block diagram of a control device mounted in a vehicle according to a fifth embodiment of the present invention.

A fifth embodiment will be described with reference to FIG. 12. FIG. 12 is a functional block diagram of a control device 1810 mounted on the vehicle 1300. The vehicle 1300 according to the present embodiment has the same configuration as the vehicle 1300 (see FIG. 9) described in the third embodiment above. As illustrated in FIG. 12, the vehicle 1300 includes a rotating electric machine 800, a power conversion device 770, a control device 1810 that controls the power conversion device 770, a parking brake device 1820, a parking brake sensor 1830, and a temperature sensor 1840.

The parking brake device 1820 is configured to exert a braking force when the vehicle 1300 is parked. Note that the parking brake device 1820 may use a disc brake or may be a braking device provided separately from the disc brake. The parking brake device 1820 is in an operating state in a case where an operation member provided in the cabin of the vehicle 1300 is operated to enter a parking position, and is in a non-operating state in a case where the operation member is not operated to enter the parking position.

The parking brake sensor 1830 is a detection device that detects the state of the parking brake device 1820 and outputs the detection result to the control device 1810. The parking brake sensor 1830 is, for example, a sensor that detects an operation position of an operation member for operating the parking brake device 1820.

The temperature sensor 1840 is a detection device that detects information on the operating temperature of the bearings 201, 202.

The control device 1810 is configured from a computer that includes a processor such as a central processing unit (CPU), a volatile memory known as a so-called random access memory (RAM), a nonvolatile memory such as a read only memory (ROM) or a flash memory, an input/output interface, and other peripheral circuits. Note that the control device 1810 may include one computer or may include a plurality of computers.

The control device 1810 functions as an arithmetic unit 1811, a determination unit 1812, and a drive controller 1813 by executing a program stored in the nonvolatile memory. The arithmetic unit 1811 calculates an average value of the operating temperatures of the bearings 201, 202 based on the detection results of the temperature sensor 1840.

The determination unit 1812 determines whether the parking brake device 1820 is in an operating state based on the sensor signal from the parking brake sensor 1830. When a signal indicating that the operation position of the operation member of the parking brake device 1820 is in the parking position is inputted from the parking brake sensor 1830, the determination unit 1812 determines that the parking brake device 1820 is in operation. When a signal indicating that the operation position of the operation member of the parking brake device 1820 is not in the parking position is inputted from the parking brake sensor 1830, the determination unit 1812 determines that the parking brake device 1820 is not in operation.

The determination unit 1812 determines whether the average value of the operating temperatures of the bearings 201, 202 calculated by the arithmetic unit 1811 is equal to or greater than a threshold value T1. The threshold value T1 is a threshold value for determining whether the average value of the operating temperatures of the bearings 201, 202 has reached the target operating temperature, and is determined in advance through experimentation or the like, and stored in the nonvolatile memory.

The drive controller 1813 executes warm-up operation control in a case where the determination unit 1812 determines that the parking brake device 1820 is in operation and the determination unit 1812 determines that the average value of the operating temperatures of the bearings 201, 202 is less than the threshold value T1. Note that the drive controller 1813 does not execute the warm-up operation control in a case where the determination unit 1812 determines that the parking brake device 1820 is not in operation or in a case where the determination unit 1812 determines that the average value of the operating temperatures of the bearings 201, 202 is equal to or greater than the threshold value T1.

In the warm-up operation control, by controlling the power conversion device 770 to supply power from the battery 1350 to the coil 600 in a state where the rotor 802 is stopped, the drive controller 1813 increases the operating temperatures of the bearings 201, 202 by the heat generation of the coil 600.

In a case where the warm-up operation control is being executed, when the determination unit 1812 determines that the parking brake device 1820 is not in operation or when the determination unit 1812 determines that the average value of the operating temperatures of the bearings 201 and 202 is equal to or greater than the threshold value T1, the drive controller 1813 ends the warm-up operation control.

As described above, by controlling the power conversion device 770 to supply power from the battery 1350 to the coil 600 in a state where the rotor 802 is stopped, the control device 1810 according to the fifth embodiment performs the warm-up operation control to raise the temperatures of the first bearing 201 and the second bearing 202 by the heat generation of the coil 600. As a result, by increasing the temperatures of the first bearing 201 and the second bearing 202 while the vehicle 1300 is stopped, it is possible to reduce the sliding loss of the first bearing 201 and the second bearing 202 when the vehicle 1300 starts traveling.

Note that the present invention is not limited to or by the above-described embodiments, and includes various modifications. For example, the above-described embodiments have been described in detail to facilitate understanding of the present invention, and are not necessarily limited to embodiments having all the configurations described. In addition, part of the configuration of one embodiment can be replaced with the configuration of another embodiment, and the configuration of the other embodiment can also be added to the configuration of the one embodiment. Moreover, it is possible to add other configurations to part of the configuration of each embodiment, and to delete or replace part of the configuration of the embodiments.

REFERENCE SIGNS LIST 201 first bearing
201s accommodation space
202 second bearing
202s accommodation space
300 stator holding member
301, 302 seal
400 rotor case
401 first case part
401h refrigerant circulation hole (pit)
401s first closed space (space)
402 second case part
402s second closed space (space)
500 stator case
501 first flow path formation body
501h refrigerant circulation hole (pit)
501s first flow path
502 second flow path formation body
502h refrigerant circulation hole (pit)
502s second flow path
600 coil
601 coil end part
602 coil end part
770 power conversion device
800 rotating electric machine
801 stator
801c stator core
802 rotor
1000 electric wheel
1010 tire
1020 wheel
1030 rotor frame
1040 connecting member
1050 bearing

18

1060 shaft
1100 rotating electric machine
1300 vehicle
1320 vehicle wheel
1350 battery
1600 vehicle
1620 vehicle wheel
1650 battery
1660 power conversion device
1670 transmission
1810 control device

The invention claimed is:

1. A rotating electric machine which includes a stator having a plurality of coils and a stator core around which the plurality of coils are wound, a rotor rotatably supported relative to the stator with a predetermined gap therebetween, a rotor case that holds the rotor, and a first bearing and a second bearing that rotatably support the rotor case, the rotating electric machine comprising:
a first flow path formation body that forms a first flow path through which a refrigerant flows to a coil end part protruding from the stator core;
a first case part that forms an accommodation space of the first bearing, that is connected to the first flow path of the first flow path formation body, and that fills the accommodation space with the refrigerant;
a second flow path formation body that forms a second flow path through which the refrigerant flows to a coil end part arranged on a side opposite to the coil end part in an axial direction; and
a second case part that forms an accommodation space of the second bearing, that is connected to the second flow path of the second flow path formation body, and that fills the accommodation space with the refrigerant,
wherein, when viewed from a radial direction of the rotor, either or both of the first bearing and the second bearing are arranged on an outer diameter side of the coil end part and in a position overlapping the coil end part.

2. The rotating electric machine according to claim 1, wherein the refrigerant is a liquid.

3. The rotating electric machine according to claim 1, wherein the refrigerant is a lubricating oil for the first bearing and the second bearing.

4. The rotating electric machine according to claim 1, wherein operating temperature of the first bearing and the second bearing increases by heat generation of the coil, such that viscosity of the refrigerant in the first bearing and the second bearing is lowered.

5. The rotating electric machine according to claim 1, wherein, when viewed from an axial direction of a shaft supporting the rotor, either or both of the first bearing and the second bearing are arranged in a position overlapping the coil end part.

6. The rotating electric machine according to claim 1, wherein
the first case part forms a first space which communicates with the first flow path via the accommodation space of the first bearing, and
the second case part forms a second space which communicates with the second flow path via the accommodation space of the second bearing.

7. The rotating electric machine according to claim 6, wherein
a pit that establishes communication between the first flow path and the first space is provided to the first flow path formation body or the first case part, and a pit that establishes communication between the second flow path and the second space is provided to the second flow path formation body or the second case part.

8. An electric wheel including the rotating electric machine according to claim 1, wherein the rotating electric machine is directly coupled to the wheel only by a mechanical coupling part, without interposing a gear.

9. A vehicle including the rotating electric machine according to claim 1, the vehicle comprising:
the rotating electric machine;
a battery; and
a power converter that converts DC power of the battery into AC power and supplies the AC power to the rotating electric machine,
wherein the torque of the rotating electric machine is transmitted to vehicle wheels.

10. The vehicle according to claim 9, further comprising:
a controller that controls the power converter,
wherein, by controlling the power converter to supply power from the battery to the coil in a state where the rotor is stopped, the controller performs warm-up operation control to increase temperatures of the first bearing and the second bearing by heat generation of the coil.

11. A vehicle comprising a rotating electric machine, wherein the rotating electric machine includes a stator having a plurality of coils and a stator core around which the plurality of coils are wound, a rotor rotatably supported relative to the stator with a predetermined gap therebetween, a rotor case that holds the rotor, and a first bearing and a second bearing that rotatably support the rotor case, the rotating electric machine comprising:
a first flow path formation body that forms a first flow path through which a refrigerant flows to a coil end part protruding from the stator core;
a first case part that forms an accommodation space of the first bearing, that is connected to the first flow path of the first flow path formation body, and that fills the accommodation space with the refrigerant;
a second flow path formation body that forms a second flow path through which the refrigerant flows to a coil end part arranged on a side opposite to the coil end part in an axial direction; and
a second case part that forms an accommodation space of the second bearing, that is connected to the second flow path of the second flow path formation body, and that fills the accommodation space with the refrigerant, the vehicle further comprising:
a battery;
a power converter that converts DC power of the battery into AC power and supplies the AC power to the rotating electric machine, wherein the torque of the rotating electric machine is transmitted to vehicle wheels; and
a controller that controls the power converter, wherein, by controlling the power converter to supply power from the battery to the coil in a state where the rotor is stopped, the controller performs warm-up operation control to increase temperatures of the first bearing and the second bearing by heat generation of the coil.

12. The vehicle according to claim 11, wherein the refrigerant is a liquid.

13. The vehicle according to claim 11, wherein the refrigerant is a lubricating oil for the first bearing and the second bearing.

14. The vehicle according to claim 11, wherein operating temperature of the first bearing and the second bearing increases by heat generation of the coil, such that viscosity of the refrigerant in the first bearing and the second bearing is lowered.

15. The vehicle according to claim 11, wherein, when viewed from an axial direction of a shaft supporting the rotor, either or both of the first bearing and the second bearing are arranged in a position overlapping the coil end part.

16. The vehicle according to claim 11, wherein
the first case part forms a first space which communicates with the first flow path via the accommodation space of the first bearing, and
the second case part forms a second space which communicates with the second flow path via the accommodation space of the second bearing.

17. The vehicle according to claim 16, wherein
a pit that establishes communication between the first flow path and the first space is provided to the first flow path formation body or the first case part, and
a pit that establishes communication between the second flow path and the second space is provided to the second flow path formation body or the second case part.

18. An electric wheel comprising the rotating electric machine according to claim 11, wherein the rotating electric machine is directly coupled to the wheel only by a mechanical coupling part, without interposing a gear.

* * * * *